United States Patent [19]
Nerstad

[11] 3,926,288
[45] Dec. 16, 1975

[54] CENTRIFUGAL CLUTCH WITH OVERSPEED RELIEF VALVE

[75] Inventor: Karl A. Nerstad, Peoria, Ill.

[73] Assignee: Caterpillar Tractor Co., Peoria, Ill.

[22] Filed: Sept. 3, 1974

[21] Appl. No.: 502,828

[52] U.S. Cl............ 192/104 F; 192/105 A; 137/57
[51] Int. Cl.² ........................................ F16D 43/284
[58] Field of Search....... 192/106 F, 103 FA, 104 F, 192/105 A, 85 F

[56] References Cited
UNITED STATES PATENTS

| | | | |
|---|---|---|---|
| 3,094,203 | 6/1963 | Jania et al. | 192/106 F |
| 3,390,594 | 7/1968 | Gillespie | 192/104 F |
| 3,483,852 | 12/1969 | Newman et al. | 192/103 FA |
| 3,667,583 | 6/1972 | Richards | 192/105 A |

*Primary Examiner*—Benjamin W. Wyche
*Attorney, Agent, or Firm*—Phillips, Moore, Weissenberger Lempio & Strabala

[57] ABSTRACT

A clutch for a vehicle transmission includes a centrifugal overspeed relief valve for disengaging the clutch when overspeed is imminent. The clutch is frictionally engaged by hydraulic pressure. When overspeed is imminent, the overspeed relief valve vents the hydraulic pressure engaging the clutch so as to disengage the clutch plates. When overspeed is corrected, the valve again closes and the clutch plates are re-engaged.

6 Claims, 3 Drawing Figures

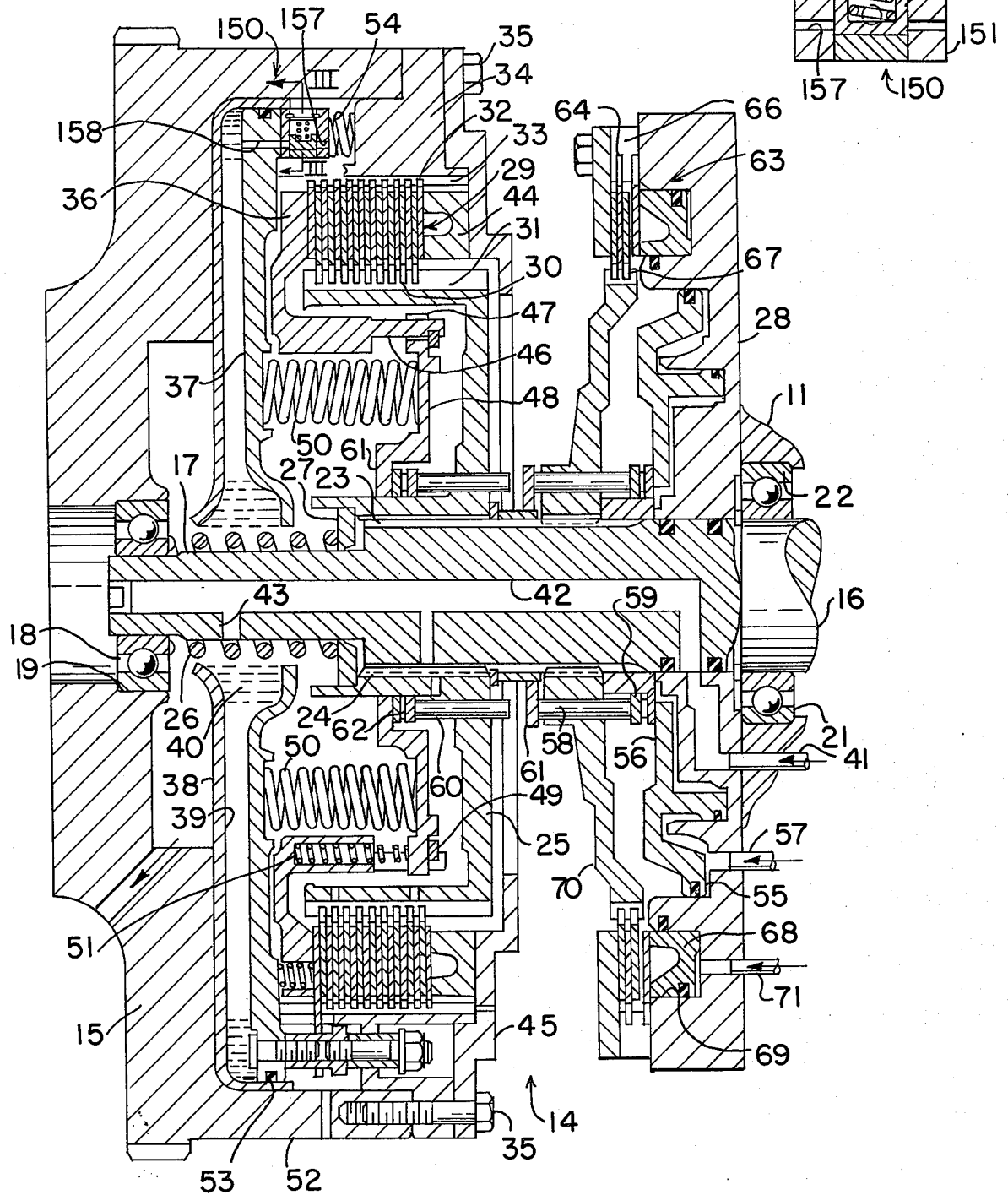

CENTRIFUGAL CLUTCH WITH OVERSPEED RELIEF VALVE

BACKGROUND OF THE INVENTION

This invention is directed to a vehicle power transmission having a hydraulically operated rotating clutch. More particularly, this invention is directed to such a clutch having a centrifugal relief valve for disengaging the clutch when overspeed is imminent.

In vehicle transmissions, hydraulically operated friction clutches are frequently used wherein a pair of clutch plates are frictionally engaged by means of hydraulic pressure. The use of such hydraulically operated clutches and their control systems is illustrated by the following U.S. Pat. Nos. and application: 3,217,851 to Mogk et al; 3,667,309 to Franz et al; and Application Ser. No. 394,166 to Herr, filed Sept. 4, 1973, and assigned to the assignee hereof. Also known is the use of centrifugally operated overspeed relief valves in conjunction with such clutches as illustrated by the following U.S. Pat. Nos.: 2,297,480 to Kratzmann and 3,667,583 to Richards. These overspeed relief valves are carried by either the driving or driven members and operate to release or dump the hydraulic pressure when maximum allowable speed is reached, and thus causing disengagement of the clutch plates. It is frequently the case that the overspeed relief valves are mounted on the periphery of the clutch disc. Generally, rotating clutches of this type are engaged by a hydraulic pressure source. However, one problem that is encountered with rotating clutches of this type is a tendency to remain engaged even in the absence of hydraulic pressure from a pressure source. Another similar problem is the tendency of these clutches to remain engaged even when the engine attains an overspeed condition.

SUMMARY AND OBJECTS OF THE INVENTION

It is therefore the primary object of this invention to provide a means for solving the above problems.

It is a further object of this invention to provide a means to prevent damage due to overspeeding.

It is a further object to provide such a means in the form of an improved centrifugal overspeed relief valve that will prevent engine damage due to overspeeding because of an improper downshift as caused by an operator error or control malfunction.

It is a further object to provide a clutch centrifugal overspeed relief valve which is of simple mechanical construction and is less costly to produce.

The invention takes the form of an overspeed relief valve for a hydraulically operated clutch. The centrifugally operated valve operates to disengage the clutch when overspeed is imminent by venting the hydraulic pressure engaging the clutch. The relief valve operates by dumping hydraulic pressure to disengage the clutch plates when overspeed is imminent as caused by improper downshift or by a control system malfunction. The relief valve is attached to a piston adjacent to a rotating torus of hydraulic fluid to engage an input clutch. The inner radius of the torus is controlled by radially locating an escape orifice so that the clutch remains engaged below a predetermined speed setting of the engine. At recommended engine speeds the relief valve piston operates to mechanically close off a cross hole to allow the torus of fluid to refill and permit engagement of the clutch.

Further objects and advantages will be readily apparent from having reference to the following description and accompanying drawings.

BRIEF DESCRIPTION OF THE DRAWINGS

FIG. 2 is an enlarged cross-sectional elevation view of the clutch of FIG. 1 taken along lines II—II therein; and, FIG. 3 is an enlarged cross-sectional elevation view of the centrifugal overspeed relief valve taken along lines III—III in FIG. 2.

DETAILED DESCRIPTION

Figure 1:
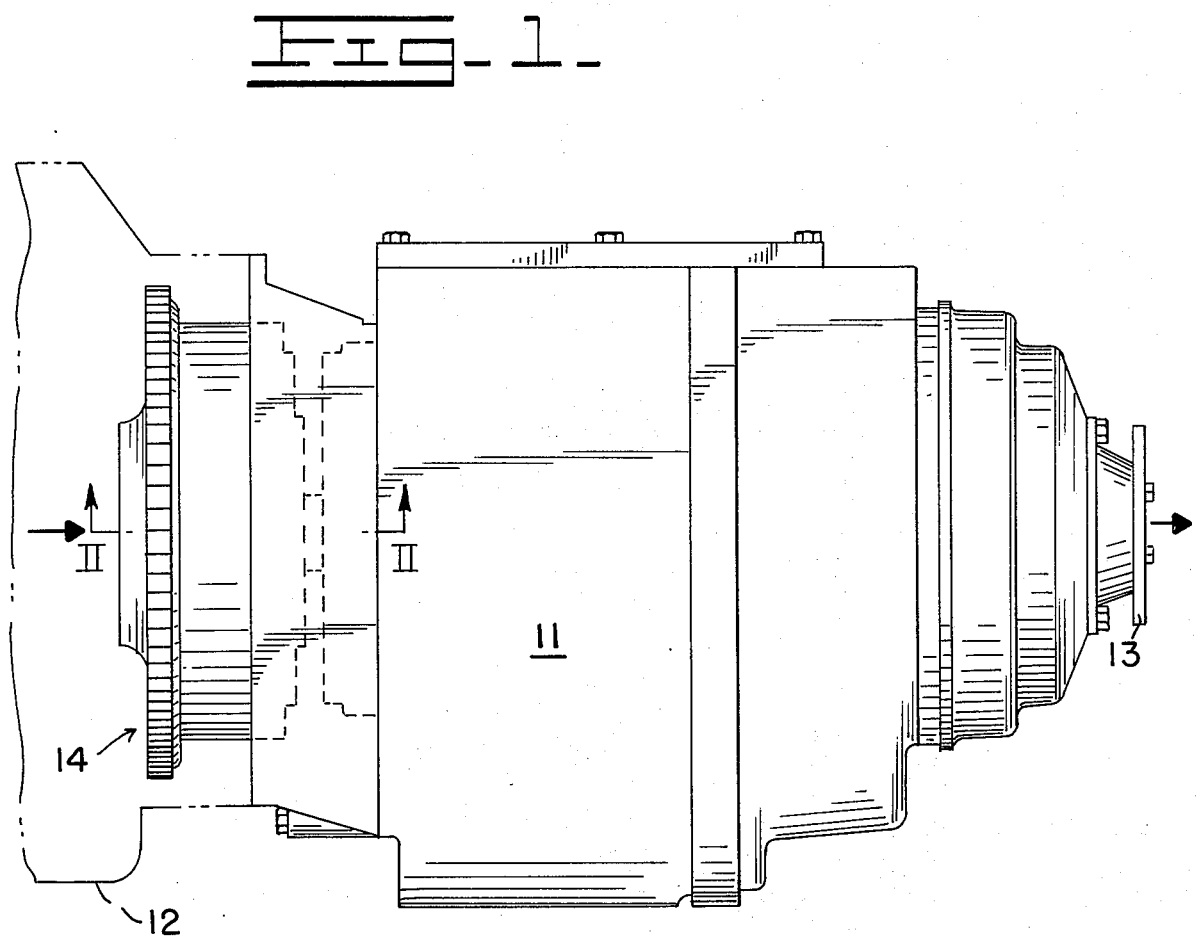
FIG. 1 is a side elevation view of a vehicle transmission and input clutch together with an associated engine in phantom.

Referring to FIG. 1 there is shown generally at 10 an engine assembly including a transmission 11 which transmits power between engine 12, shown in phantom, and the drive line 13 of a vehicle. The transmission may be as conventional as, for example, truck vehicle application, wherein a plurality of quick change gears (not shown) provides a like plurality of drive ratios between the engine and the drive line. Transmission 11 is of a type in which the internal gears are decoupled both from engine 12 and drive line 13 in the course of a shift and is braked to a stop in order that the gears may be shifted while stationary. A "stop and go" transmission of this type is illustrated in U.S. Pat. No. 3,508,450 to Richards, of common assignment herewith. Input clutch 14 is provided to disconnect engine 12 from the input of transmission 11 as will be hereinafter described.

Referring now to FIG. 2, input clutch 14 includes a circular flywheel 15 which is connected to the engine by conventional means (not shown). At the output of clutch 14 is a transmission input shaft 16 which includes a smaller diameter stepped end portion 17. Shaft 16 is supported at its front, stepped end portion by a bearing 18 in an annular recess 19 in the flywheel. Input shaft 16 is also supported at its rear end by a bearing 21 in an annular recess 22 in transmission 11. Input shaft 16 includes a plurality of axially oriented splines 23 which engage a similar plurality of splines 24 within an inner bore of a circular driven hub 25 so that the hub and shaft 16 move together rotationally but are relatively, axially movable. A compression spring 26 is disposed coaxially around stepped portion 17 of the input shaft and abuts bearing 18 and an annular washer 27 which, in turn, abuts hub 25 so as to urge it towards front wall member 28 of transmission 11.

When the clutch is engaged, hub 25 transmits torque by way of a clutch pack 29 including a plurality of annular driven plates 30 which are axially movable on splines 31 on the outer diameter of hub 25. The clutch pack also includes a plurality of annular driving plates 32 which are axially movable on splines 33 on outer hub 34. The outer hub is, in turn, fixed to flywheel 15 by a plurality of spaced bolts around the flywheel periphery.

The engagement and disengagement of the clutch pack 29 is dependent upon force applied to annular pressure plate 36 which is axially movable so as to compress the clutch pack. Thus, if clutch pack 29 is compressed, torque will be transmitted from flywheel 15 to transmission input shaft 16 and if the pressure on the clutch pack is released, the clutch 14 is disengaged. Since this force must be variable under certain operating conditions, an annular capacity modifying piston 37 is sealingly, axially movable within a generally cup-shaped liner 38 forming a chamber 39 therebetween.

The centrifugal force of the torus of fluid 40 maintained in chamber 39 creates an axial force acting against piston 37 with the magnitude of the force being a function of engine speed. Fluid 40 is supplied from the engine lube system (not shown) by way of conduit 41, and passages 42 and 43 in input shaft 16. The fluid is directed out of passage 43 and is directed radially outwardly by centrifugal action so as to be caught by chamber 39.

Control of the pressure on clutch pack 29 is effected by a combination of elements which respond to operating conditions. The back end of the clutch pack 29 abuts an annular stop 44 carried by pressure plate 45 secured to outer hub member 34 and thus to flywheel 15. Annular pressure plate 36 has axially directed tangs 46 which extend rearwardly through slots 47 in an annular plate 48 disposed coaxially on input hub 25 and which is axially slidable relative thereto. Plate 48 is arranged for a limited amount of free travel but upon being shifted forwardly acts to relieve the force of pressure plate 45 on clutch pack 29 and upon being shifted rearwardly acts to force the plate against the clutch pack by contacting a lip 49 carried by tangs 46. A plurality of small compression springs 50 act between pressure plate 45 and plate 48 to urge the two elements apart.

Liner 38 extends rearward adjacent the inner surface of flywheel portion 52 for a distance exceeding the possible travel of capacity modifying piston 37 and an annular seal 53 is mounted in the rim of piston 37 to engage the liner 38 to provide a fluid tight seal therebetween. Accordingly, piston 37 is urged rearwardly by a fluid pressure which tends to be a function of engine speed although as will be hereinafter discussed, desirable momentary departures from a strict correlation occur under certain operating conditions.

The plurality of compression springs 50 are spaced angularly around the axis of shaft 16 between capacity modifying piston plate 37 and plate 48 to exert a force on pressure plate 36 tending to engage the clutch 14. As the engagement springs 51 react against piston 37 the engagement force which pressure plate 45 exerts on clutch pack 29 is determined not only by the parameters of the springs but also by the axial position of piston 37 as it responds to the centrifugally generated fluid forces thereon. This tends to increase the engagement force acting on clutch pack 29 as engine speed increases to modulate the capacity of clutch pack 29 in accordance with engine speed at the lower range of speeds.

It is desirable that the clutch 14 completely disengage below a predetermined low engine speed. This requires a force acting forwardly on modifying piston 37 sufficient to overcome the fluid pressure thereon at low engine speeds and for this purpose a plurality of disengagement springs 54 are spaced angularly around the axis of shaft 16 between modifying piston 37 and input member 34. Thus, the disengagement springs 54 supplement the force of springs 50 on modifying piston 37, but unlike springs 50 do not react against pressure plate 45.

In operation, at a predetermined low engine speed, springs 54 hold piston 37 forward to maintain disengagement of the clutch 14 thereby decoupling the vehicle engine from the transmission 11. As the engine speed exceeds this level, a modulated engagement of the clutch occurs as the centrifugally generated pressure of fluid 40 increasingly overcomes the force of the springs 54 and 50 to gradually engage the clutch. Above a higher predetermined engine speed, the clutch is fully engaged. As engine speed decreases from a high value, a reverse action occurs in that slipping of the clutch commences at an intermediate level and progresses into complete disengagement at a still lower level. In particular, if engine speed increases very rapidly at start-up, due to a rapidly opened throttle, the inertia of the fluid volume 40 tends to cause the centrifugal pressure in chamber 39 to lag behind engine speed and therefore to delay the modulated engagement of the clutch momentarily. If, for example, modulated engagement normally begins when the engine speed reaches 750 rpm, the inertia effect may delay the beginning of engagement until about 1,200 rpm in the case where the engine is accelerated more rapidly than is the case in a normal start-up. This is significant in that rapid engine acceleration from low idle with the clutch disengaged is a skilled operator's normal action when his vehicle must be started up under heavy load or while stopped on a steep incline.

Disengagement of the clutch 14 must be forced, regardless of engine speed, to prepare for a shift of the associated transmission. Accordingly, the forward face of transmission wall 28 has an annular cavity 55 and an annular piston 56 in disposed therein. A conduit 57 communicates with cavity 55 behind piston 56 to admit fluid pressure when a shift is to be made in order to force the piston 56 forwardly. A control system suitable for supplying such a fluid signal in response to the operator's manipulation of the transmission shift lever between speed ratio settings is disclosed in U.S. Pat. No. 3,508,450 to Franz et al, assigned to the assignee hereof.

Upon application of fluid pressure to conduit 57, piston 56 is moved forwardly and acts against a series of pins 58 through an annular needle bearing 59 thereby shifting the pins forwardly. Pins 58 are transpierced through an annular brake hub 70 splined to transmission input shaft 16 and bear against a ring 61 which is slidable along the input shaft. After a limited amount of such motion, ring 61 contacts the ends of a similar set of pins 60 transpierced through the driven hub 25. Pins 60 in turn bear against member 61 through a friction disc 62. Thus, the initial forward movement of piston 56 does not affect the clutch pack 29 until ring 61 contacts pins 60 and thereafter further movement acts to force modifying piston 37 forward by compressing springs 50 and 51. This action relieves the pressure of engagement on the clutch pack 29 and thus disengages the clutch in order that the transmission may be shifted. At the completion of the shift, the fluid pressure in signal conduit 57 is relieved and the above-described action is reversed to re-engage the clutch. The friction disc 62 acts to impart some initial acceleration to transmission input shaft 16 in advance of engagement of the clutch to assure that all gears in the transmission mesh before the full torque force is applied. During re-engagement, appropriate modulation occurs as hereinbefore described.

For the purpose of braking the input shaft to a stop prior to shifting gears, a brake disc pack 63 is operative between transmission wall 28 and brake hub 70. Alternate plates 64 of pack 63 are splined to an annular member 66 secured to wall 28 and the intervening brake plates 67 are splined to the brake hub 70. A second piston 68 is disposed within an annular cavity 69 in transmission wall 28 and a brake signal conduit 71 communicates with a cavity to receive a fluid pressure signal at the start of the shift whereby the piston is forced forwardly to compress the plates 64 and 67, thereby stopping the transmission input shaft 16. Means for generating the necessary braking signal and for coordinating such signal with the disengagement signal to conduit 57 are described in the hereinbefore identified U.S. Pat. No. 3,570,636.

Whenever an improper or severe downshift occurs, the vehicle drives the transmission and engine, giving the transmission input and engine the potential of reaching many times normal speed and thereby causing extensive engine damage. To prevent this damage and as seen in FIGS. 2 and 3, a centrifugal relief valve 150 is provided which is fastened integral with the piston plate 37. Relief valve 150 comprises a body 151 having a cylindrical bore 152 therein. A correspondingly shaped piston 153 is reciprocably contained within bore 152 by means of a spring 154, a washer 155 and a spring retainer 156. At normal operating speeds the spring force of the spring 154 is set to overcome the radially outwardly directed force of piston 153 and maintains the position shown. In this position, piston 153 blocks cross drilled bore 157 which registers with passage 158 in piston plate 37, to prevent fluid from leaving chamber 39.

When overspeed occurs, however, the centrifugal force of the piston 153 overcomes the force of spring 154 and causes the piston to move radially outwardly. This, in turn, uncovers cross drilled bore 157, permitting fluid to flow out of chamber 39, through passage 158 and bore 157. Most of the fluid 40 is thus released from chamber 39 and this, in turn, causes clutch 14 to disengage due to the reduction in the force generated by the centrifugal action of the fluid.

When the engine speed again reaches a safe level, the valve piston will move radially inwardly and again cover bores 157. In this manner, fluid entering chamber 39 from passage 44 will again fill the chamber and will again cause clutch 14 to engage. The centrifugal relief valve can be set to open at any of various preselected engine speeds by using springs of appropriate spring rates.

Thus, it is seen that the instant invention provides means for automatically disengaging a clutch when engine overspeed is imminent and for automatically re-engaging the clutch when engine speed has again dropped to a safe level.

It is to be understood that the foregoing description is illustrative of a preferred embodiment of the invention is not to be limited thereto but is to be determined only by the scope of the appended claims.

What is claimed is:

1. In a clutch for transmitting torque from an engine to the input shaft of a transmission, said clutch including
a rotatable input member having means for connection to said engine and having means defining an annular fluid retaining chamber whereby centrifugal force generates fluid pressure in said chamber which is a function of engine speed and thereby the rate of rotation of said input member,
a driven hub disposed coaxially with respect to said input member and being drivingly coupled to said transmission input shaft,
a clutch pack of annular input clutch plates disposed coaxially with respect to said input member, said pack having at least one driving plate constrained for rotation with said input member and having at least one driven plate constrained for rotation with said driven hub,
an annular pressure plate disposed coaxially with respect to said clutch plates for exerting a force thereon tending to engage said driving and driven plates,
an annular clutch capacity modifying member disposed in said chamber of said input member and exposed to said fluid pressure therein, said input clutch capacity modifying member being movable axially in response to changes of said fluid pressure,
at least one engagement spring acting between said capacity modifying member and said pressure plate for exerting a force on said pressure plate tending to engage said input clutch plates,
at least one disengagement spring acting on said capacity modifying member in opposition to the force of said fluid pressure thereon whereby said engagement spring is ineffective to engage said input clutch plates until said fluid pressure reaches a first predetermined level, and further including
centrifugal overspeed relief means for automatically disengaging said clutch when engine speed has reached a second, higher predetermined level and for automatically re-engaging said clutch when speed drops below said second level whereby damage due to overspeeding is prevented.

2. The invention of claim 1 wherein said overspeed relief means comprises a centrifugally operated valve including a body and piston means for normally closing off a cross-bore in said body, said cross-bore in said body being in communication with passage means communicating with said fluid retaining chamber.

3. The invention of claim 2 wherein said piston means comprises a piston reciprocable within a piston bore in said valve body, and further including spring means for opposing centrifugal movement of said piston and thereby the opening of communication between said fluid retaining chamber with the valve exterior by way of said passage means and said cross bore.

4. The invention of claim 3 wherein said spring means comprises a spring and further including retainer means for retaining said spring within said piston bore.

5. The invention of claim 4 wherein said retainer means comprises a washer and a spring retainer located within said piston bore.

6. The invention of claim 3 wherein said piston bore is generally radially directed so that centrifugal force acting on said piston causes generally radially directed movement thereof.

\* \* \* \* \*